United States Patent
Chang et al.

(10) Patent No.: US 8,065,547 B2
(45) Date of Patent: Nov. 22, 2011

(54) CONTROL METHOD AND COMPUTER SYSTEM FOR ADVANCED CONFIGURATION AND POWER INTERFACE

(75) Inventors: Jen-Po Chang, Taipei County (TW); Grace Qin, Taipei County (TW); Cheng-Wei Huang, Taipei County (TW); Ying-Chung Chen, Taipei County (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 399 days.

(21) Appl. No.: 12/209,410

(22) Filed: Sep. 12, 2008

(65) Prior Publication Data
US 2009/0300376 A1 Dec. 3, 2009

(30) Foreign Application Priority Data
May 30, 2008 (TW) .............................. 97120125 A

(51) Int. Cl.
*G06F 1/32* (2006.01)
*G06F 1/00* (2006.01)

(52) U.S. Cl. .................. 713/330; 713/322; 713/323

(58) Field of Classification Search .................. 713/300
See application file for complete search history.

(56) References Cited

U.S. PATENT DOCUMENTS

| | | | | |
|---|---|---|---|---|
| 6,085,330 | A * | 7/2000 | Hewitt et al. | 713/322 |
| 7,225,346 | B2 * | 5/2007 | Kawano et al. | 713/300 |
| 7,475,263 | B2 * | 1/2009 | Wei et al. | 713/300 |
| 7,506,192 | B2 * | 3/2009 | Ma | 713/324 |
| 7,565,558 | B2 * | 7/2009 | Huang et al. | 713/300 |
| 7,802,119 | B2 * | 9/2010 | Huang et al. | 713/323 |
| 2005/0060591 | A1 | 3/2005 | Yoshiyama et al. | |
| 2006/0053310 | A1 * | 3/2006 | Su et al. | 713/300 |
| 2006/0136767 | A1 * | 6/2006 | Ma | 713/324 |
| 2006/0294404 | A1 * | 12/2006 | Ho | 713/300 |
| 2007/0055899 | A1 * | 3/2007 | Wei et al. | 713/300 |
| 2007/0162772 | A1 * | 7/2007 | Huang et al. | 713/300 |
| 2008/0010476 | A1 * | 1/2008 | Huang et al. | 713/322 |

OTHER PUBLICATIONS

CN Office Action mailed Aug. 14, 2009.

* cited by examiner

*Primary Examiner* — Ryan Stiglic
(74) *Attorney, Agent, or Firm* — Thomas|Kayden

(57) ABSTRACT

Provided is a control method for an advanced configuration and power interface (ACPI) in a computer system. The computer system comprises a processor and a bus master, wherein the processor, as defined by the ACPI specification, has a first state (C0 state), a second state (C1 state), a third state (C2 state), a fourth state (C3 state) and a fifth state (C4 state). The method comprises enabling the processor to run in the C2 state when a request from the bus master is issued before the processor enters the C3 state, or enables the processor to ignore the C4 state and complete the C3 state when the request from the bus master is issued at the C3 state and before entering the C4 state.

4 Claims, 6 Drawing Sheets

CONTROL METHOD AND COMPUTER SYSTEM FOR ADVANCED CONFIGURATION AND POWER INTERFACE

CROSS-REFERENCE TO RELATED APPLICATIONS

This Non-provisional application claims priority under 35 U.S.C. §119(a) on Patent Application No(s). 97, 120, 125, filed in Taiwan, Republic of China on May 30, 2008, the entire contents of which are hereby incorporated by reference.

BACKGROUND OF THE INVENTION

1. Field of the Invention

The invention relates to power management technology for processors, and more particularly to applying advanced configuration and power interface (ACPI) to power management technology for processors.

2. Description of the Related Art

Power management technology, is a method for lowering power consumption in unused computers and their peripheral devices, which increases battery efficiency. It is very important for computer systems, especially for portable computers, such as notebook computers, which often rely on power supply from batteries. Advanced configuration and power interface (ACPI) specification is a power management open standard developed by Hp, Intel, Microsoft, Phoenix and Toshiba, and is suitable for all classes of computer systems including (but not limited to) desktop computers, portable computers, workstations, and server machines. The purpose of the ACPI specification is to efficiently distribute power supply to each component in the computer system. The ACPI detects information such as temperature of motherboard, rotation speed of fans, and power supply voltage information, and provides appropriate power and optimum working frequency in order to balance power saving and efficiency. It should be noted that ACPI is an interface shared between the operating system (OS, software) and hardware, and power management herein is OS-directed instead of BIOS-directed, which is more beneficial for manufacturers when integrating their standards with each other.

The latest ACPI specification update is revision 3.0b. According to its OSPM (Operating System-directed configuration and Power Management) architecture, an OS can switch several power states among all of its systems and devices. Typically, the OS determines whether to enter the power saving mode in accordance with the configuration set by some application programs or users. The ACPI specification defines different power states which include a working state (G0), a sleeping state (G1), a soft off state (G2), and a mechanical off state (G3) as shown in FIG. 1 (please refer to FIG. 4-2 in the ACPI specification revision 3.0b). A system usually switches between a working state (G0) and a sleeping state (G1). While there are device power state definitions and processor power state definitions, due to brevity, only later will be discussed. The processor power states (including C0, C1, C2, . . . , Cn state) are all defined in the working state (G0). The processor normally executes instructions in the C0 state, while other power states (C1, C2, . . . , Cn state) have different (from short to long) latencies. Referring to FIG. 2, FIG. 2 is a state diagram of the processor. After an ACPI issues an instruction to ask the processor to enter the C4 state, the processor will sequentially enter the C2 state at the time t1, and then enter the C3 state at the time t2, and then enter the C4 state at t3.

Meanwhile, the ACPI comprises a general event model, which means that the ACPI responds to events such as plug and play, thermal and power management events and so on. However, as shown in FIG. 2, when a bus master event occurs, a computer system bus master issues a request BM_REQ, and the processor will respond to the request BM_REQ following completion of sequential state entrances from the state entered when the request was issued (in this example, the request BM_REQ was issued at the C3 state, so all states between C2 and C4 will be entered before the processor responds to the request). Additionally, following the response to the request by the processor, all states from C4 to C2 (in this example, at the time t4 the C3 state would be entered from the C4 state, at the time t5, the C2 state would be entered from the C3, and at the time t6, the C2 state would be entered from the C3 state). As such, the method is time consuming for the processor. Moreover, the C3 state of the ACPI specification is vague, thus, some devices running the specification work irregularly, such as unwanted noise for audio devices, incomplete finger print scanning, and so on.

Therefore, a novel method to make computer systems more efficient and save more power is desired.

BRIEF SUMMARY OF INVENTION

The invention provides a control method for an advanced configuration and power interface (ACPI) in a computer system, wherein the computer system comprises a processor and a bus master, and the processor, as defined by the ACPI specification, has at least a first state (C0 state), a second state (C1 state), a third state (C2 state), a fourth state (C3 state) and a fifth state (C4 state). The method comprises enabling the processor to run in the C2 state when the bus master issues a request before the processor enters the C3 state, and enabling the processor to ignore the C4 state and completes the C3 state when the bus master issues a request during the C3 state and before entering the C4 state.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
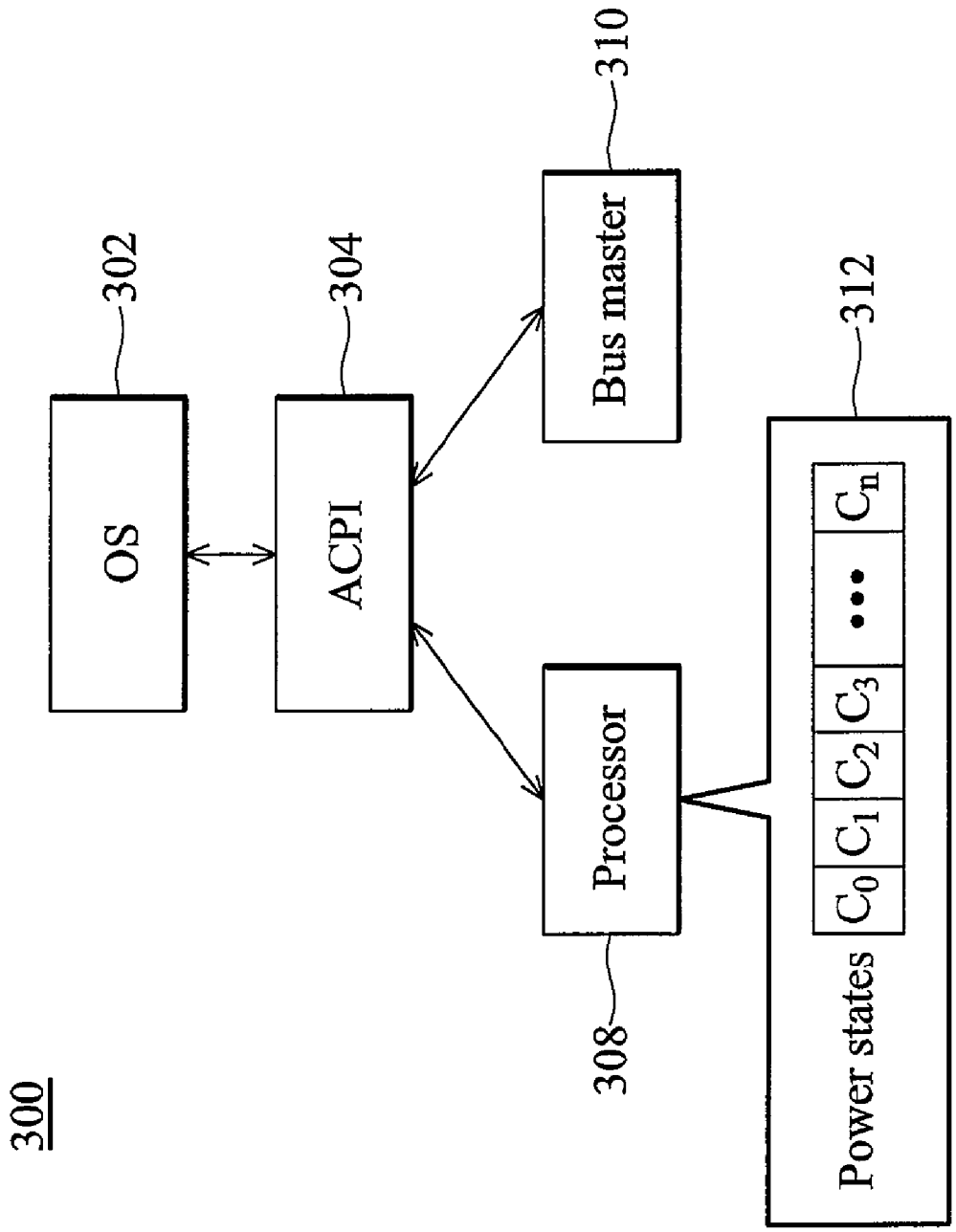
FIG. 3 shows a computer system comprising the ACPI.
Figure 4:
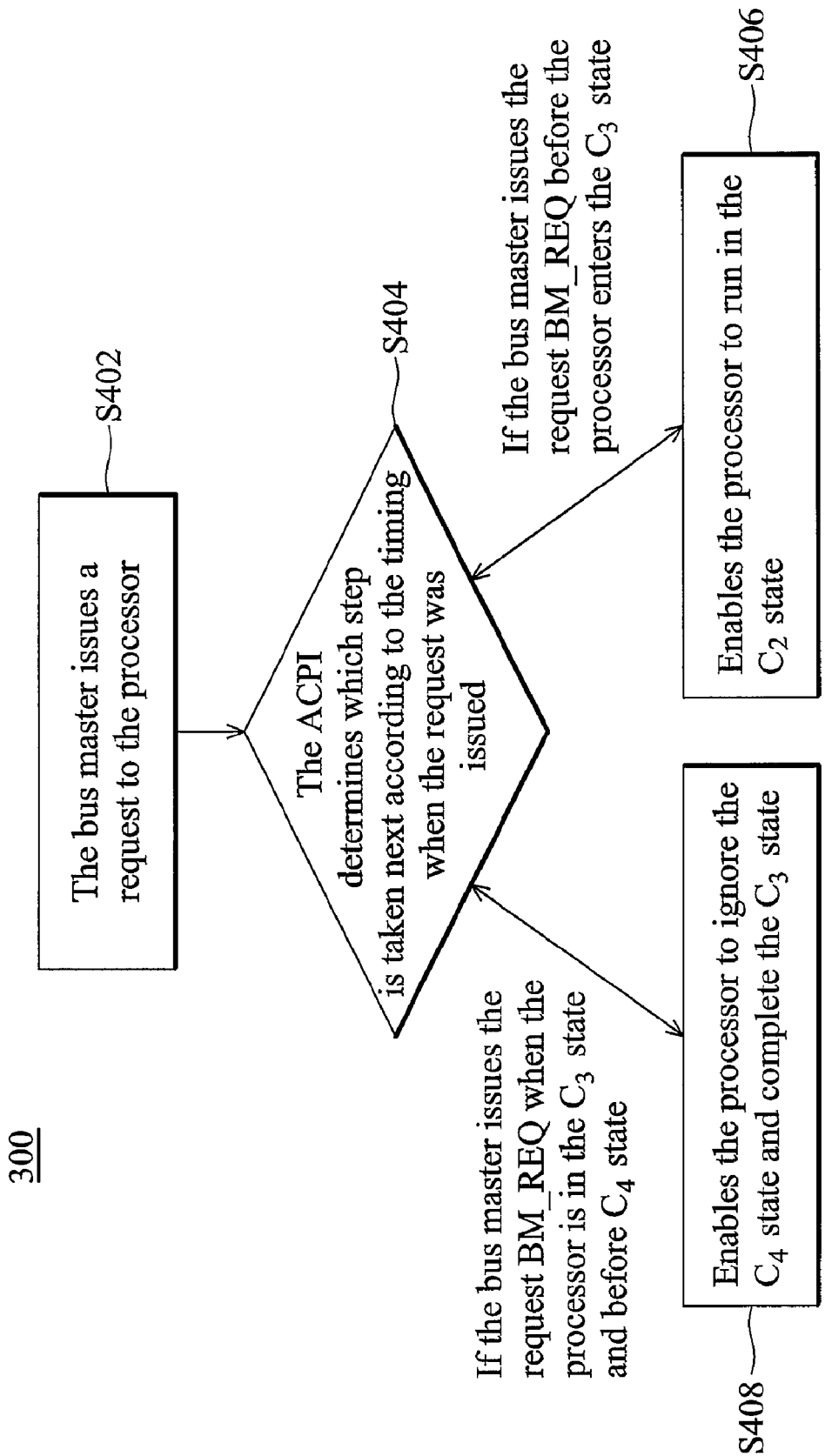
FIG. 4 is a flowchart of a control method for ACPI according to the invention.

FIG. 3 is a computer system 300 having an advanced configuration and power interface (ACPI) 304. The computer system 300 comprises software, such as an operating system (OS) 302 and other application programs (not shown), and hardware, such as a processor 308, bus master 310 and other peripheral devices (not shown). The computer system 300 herein performs power management according to an ACPI specification (for example, the ACPI specification revision 3.0b). The ACPI specification defines that the processor 308 has at least a first state (C0 state), a second state (C1 state), a third state (C2 state), a fourth state (C3 state) and a fifth state (C4 state). FIG. 4 is a flowchart of the control method ACPI according to the invention. In step S402, the bus master 310 issues a request BM_REQ to the processor 308, and then, in step S404, the ACPI 304 determines which step is taken next according to the timing when the request BM_REQ was issued. If the bus master 310 issues the request BM_REQ before the processor 308 enters the C3 state, the ACPI 304 enables the processor 308 to run in the C2 state as shown in S406. Meanwhile, if the bus master 310 issues the request BM_REQ when the processor 308 is in the C3 state and before entering C4 state, the ACPI 304 enables the processor 308 to ignore the C4 state and completes the C3 state as shown in S408.

In this embodiment, the request BM_REQ is issued to the bus master 310 by a south bridge power management unit (not shown). The power management unit in the south bridge monitors the power state of the processor 308 at the moment when the request is issued. When the processor 308 is in the C1 state or C2 state, the request BM_REQ is directly issued to the processor 308 to be processed. When the processor 308 is in the C3 state, the power management unit allows the request BM_REQ to be pending and informs the processor 308 that there is an event occurring on the bus master 310. Following, the processor 308 returns to the C2 state from the C3 state, before the request BM_REQ is issued to the processor 308 for processing.

Figure 1:
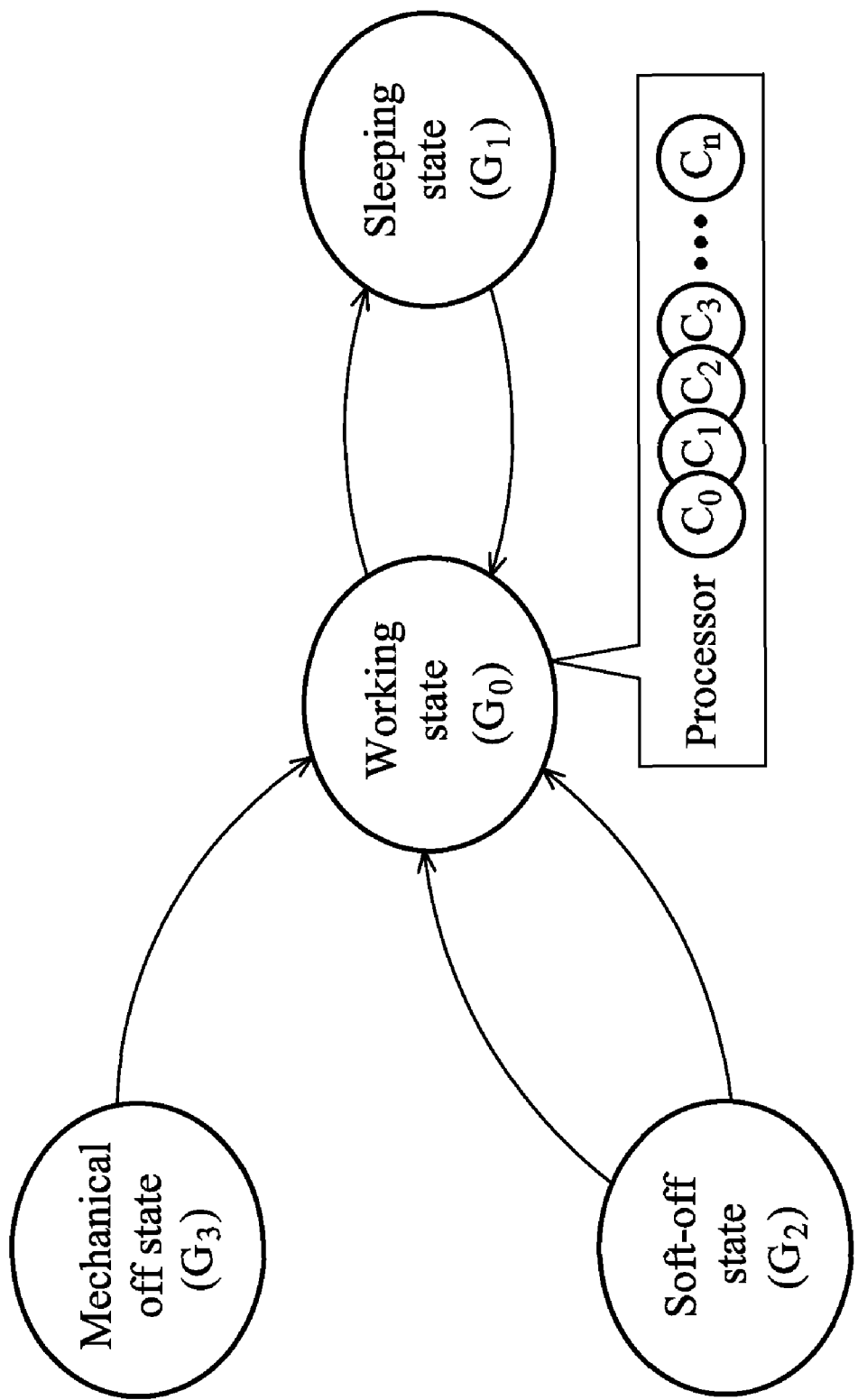
FIG. 1 is an illustrative diagram of power states in a computer system according to the ACPI specification.
Figure 2:
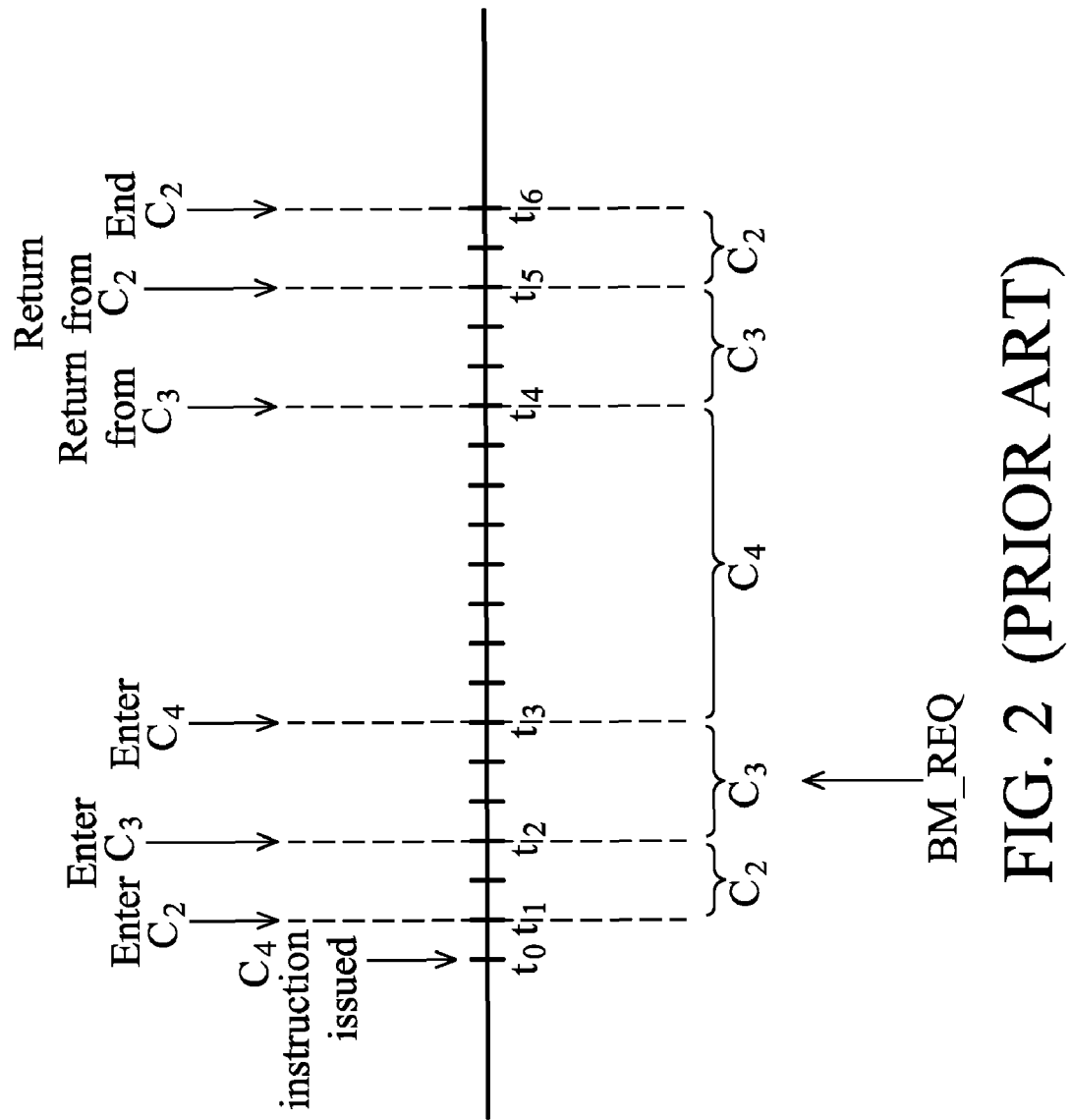
FIG. 2 is a state diagram of a processor when it receives an instruction.
Figure 5:
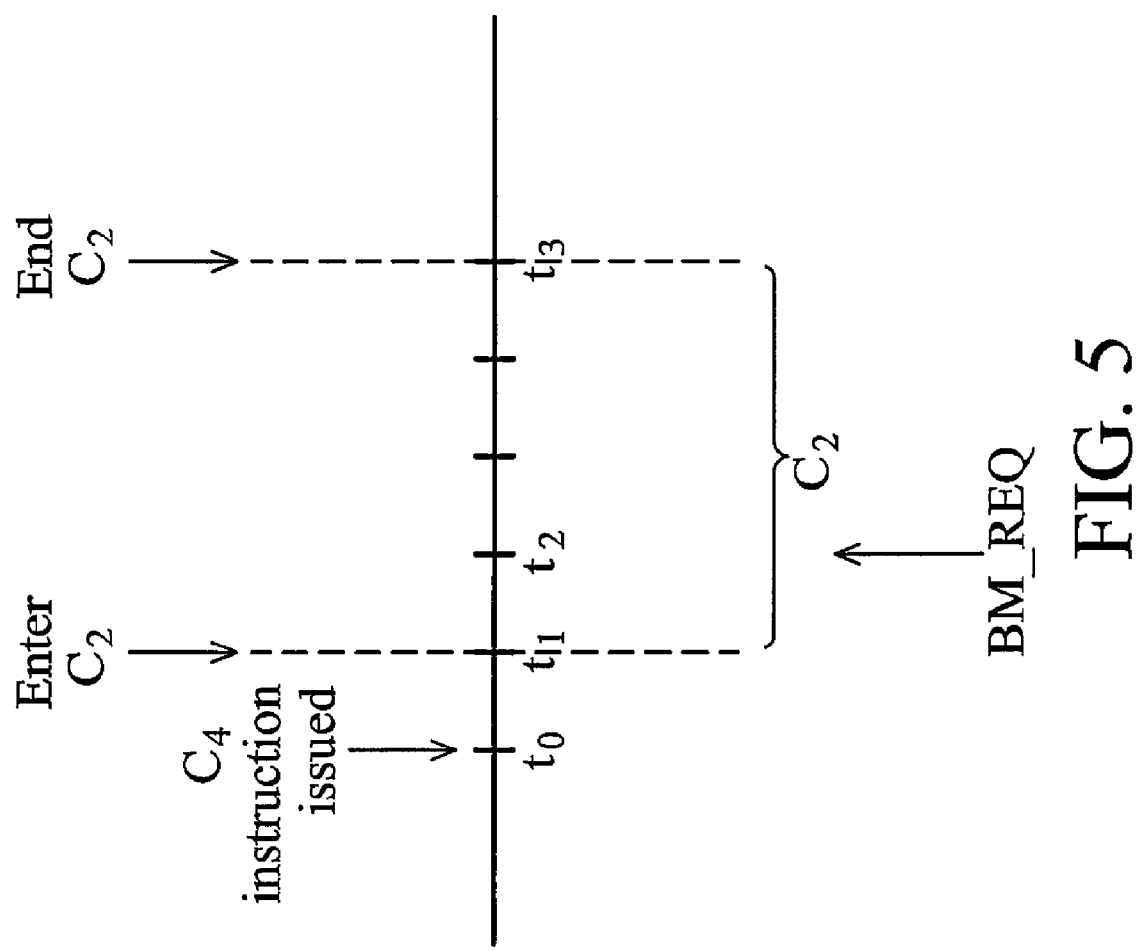
FIG. 5 is a state diagram of the processor when performing the steps from S404 to S406 according to the invention.
Figure 6:
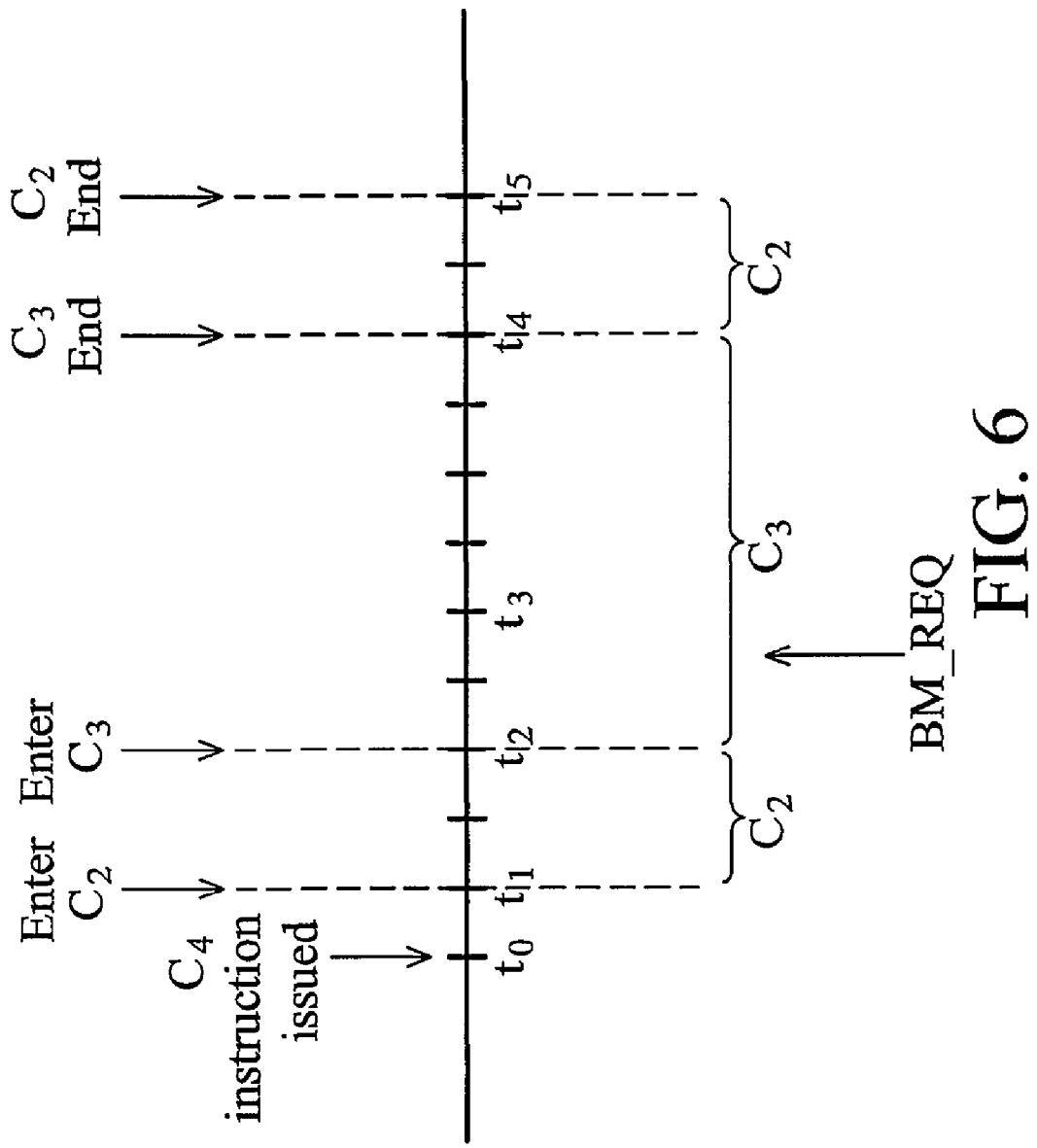
FIG. 6 is a state diagram of the processor when performing the steps from S404 to S408 according to the invention.

FIG. 5 is the state diagram of the processor 308 when performing the steps from S404 to S406 in FIG. 4 according to the invention, and FIG. 6 is the state diagram of the processor 308 when performing the steps from S404 to S408 in FIG. 4 according to the invention. When comparing FIGS. 5, and 6 with FIG. 2, note that the processor 308 according to the invention is more efficient and takes less time by avoiding entering into unnecessary power states.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A control method for an advanced configuration and power interface (ACPI) in a computer system, wherein the computer system comprises a processor and a bus master, and the processor, as defined by the ACPI specification, has at least a first state (C0 state), a second state (C1 state), a third state (C2 state), a fourth state (C3 state) and a fifth state (C4 state), comprising:
   enabling the processor to run in the C2 state when the bus master issues a request to the processor before the processor enters the C3 state; and
   enabling the processor to ignore the C4 state and complete the C3 state, when the bus master issues the request to the processor which is operating in the C3 state followed by the C4 state.

2. The control method for an advanced configuration and power interface (ACPI) in a computer system as claimed in claim 1, wherein the request is issued to the bus master by a south bridge power management unit.

3. A computer system, comprising:
   a processor;
   a bus master; and
   an advanced configuration and power interface (ACPI), wherein the processor, defined by the ACPI, has at least a first state (C0 state), a second state (C1 state), a third state (C2 state), a fourth state (C3 state) and a fifth state (C4 state), and the ACPI enables the processor to run in the C2 state when the bus master issues a request to the processor before the processor enters the C3 state, and enables the processor to ignore the C4 state and complete the C3 state when the bus master issues the request to the processor which is operating in the C3 state followed by the C4 state.

4. A computer system as claimed in claim 3, wherein the request is issued to the bus master by a south bridge power management unit.

* * * * *